United States Patent [19]

Lemay et al.

[11] Patent Number: 4,809,276
[45] Date of Patent: Feb. 28, 1989

[54] MEMORY FAILURE DETECTION APPARATUS

[75] Inventors: Richard A. Lemay, Carlisle; David A. Wallace, Chelmsford, both of Mass.

[73] Assignees: Hutton/PRC Technology Partners 1; Honeywell Bull Inc., both of Minneapolis, Minn.

[21] Appl. No.: 19,908

[22] Filed: Feb. 27, 1987

[51] Int. Cl.$^4$ .............................................. G06F 11/10
[52] U.S. Cl. ............................................ 371/38; 371/5
[58] Field of Search ................. 371/38, 13, 51, 21, 371/5; 365/201, 200; 364/200 MS File, 900 MS File

[56] References Cited

U.S. PATENT DOCUMENTS

| | | | |
|---|---|---|---|
| 4,053,751 | 10/1977 | Ault | 371/13 X |
| 4,103,823 | 8/1978 | Aichelmann | 371/51 X |
| 4,506,364 | 3/1985 | Aichelmann | 371/38 |
| 4,535,455 | 8/1985 | Peterson | 371/38 X |
| 4,562,576 | 12/1985 | Ratcliffe | 371/38 X |
| 4,709,367 | 11/1987 | Grafe | 371/38 |

Primary Examiner—Joseph Ruggiero
Assistant Examiner—Robert W. Beausoliel
Attorney, Agent, or Firm—George Grayson; John S. Solakian

[57] ABSTRACT

Memory failure detection apparatus is disclosed which is used with a large capacity memory that is organized in banks of memory, and with which error correction circuitry is used to correct correctable errors and provide an indication of same. The detection apparatus is responsive to the error indications and to a bank select addressing signal to provide and store error counts for a bank or banks of memory located on each memory board. A system processor periodically reads the error counts and responds to same to provide a maintenance message indicating that a specific memory board is to be replaced.

5 Claims, 2 Drawing Sheets

MEMORY FAILURE DETECTION APPARATUS

FIELD OF THE INVENTION

This invention relates to apparatus for detecting failures in a memory used in a data processing system.

BACKGROUND OF THE INVENTION

In the prior computer art data stored in memory is encoded with error correction codes and is checked by error detection and correction circuits to detect and correct errors in the stored information. Sometimes errors are correctable and other times errors are not correctable. The detection of correctable or non-correctable errors indicates that the memory has defective memory elements and is to be repaired. Non-correctable errors cannot be corrected and cause the system to stop using the defective memory. Correctable errors are corrected and the defective memory may still be used but an indication of the defect is given to the system processor. The defective memory must be repaired or replaced as soon as possible. In large memories located on several printed circuit boards the defective memory indications do not indicate where in the large memory the defect is located. To locate a defective memory board the system must be shut down and testing done to identify the circuit board with the defective integrated circuit memory chip. The board with the defective chip is then replaced. This procedure keeps the processor out of service for a period of time that is often unacceptable but must be tolerated anyway.

One prior art approach to keeping track of correctable errors in a large memory has been to create a counter in the memory. The counter is incremented each time a microprocessor detects a correctable error. However, if other circuit elements access the memory and a correctable error is detected the counter in memory is not incremented. In addition, although this prior art technique reports memory errors, it provides no information as to where in the memory the errors come from. Thus, the error count is of limited value. The computer system still had to be taken off line and extensive testing done to locate where error(s) are in the memory and replace or repair the appropriate memory boards. In addition, if the defective location in memory is where the defect counter is maintained, the problems are compounded.

Accordingly, there is a need in the art for apparatus to minimize system down time when there is a defective memory. In addition, there is a need in the art for apparatus that detects which printed circuit board in a multi-board memory is defective and identifies that board.

SUMMARY OF THE INVENTION

An exemplary memory failure detection circuit is provided that meets the above stated and other needs in the prior art. Apparatus is provided that is associated with a large multi-board memory in a processor to identify and count error indications from one or more discrete memory units such as a replaceable memory board. Responsive to the error indications a system processor knows that the associated discrete memory unit(s) is/are defective and must be replaced. The processor provides a maintenance indication that instructs service personnel to replace, for example, a specific defective memory board. In this manner the down time of the processor is minimized and no testing must be done to identify a defective memory unit or board.

Large capacity random access memories are typically organized as banks of memory and during addressing a bank is selected before an address is used to read or write a specific memory location in the selected memory bank. A conventional error circuit is used to correct correctable errors caused by a defective memory and to provide an output identifying the correctable error. In the embodiment disclosed herein the error correction circuits are provided for each two circuit boards containing one or more banks of memory. In the embodiment disclosed herein memory failure detection apparatus receives the error indications from the error circuit and an indication of the memory bank that was selected and provides an error output indicating a specific defective memory board. The error outputs are stored in counters which are periodically read by the system processor. The system processor is thus able to identify a specific memory board with a defective memory chip without having to take the system out of use and perform testing, and the specified defective board is quickly changed.

DESCRIPTION OF THE DRAWING

The invention will be better understood upon reading the following detailed description in conjunction with the drawing in which.

DETAILED DESCRIPTION

Figure 1:
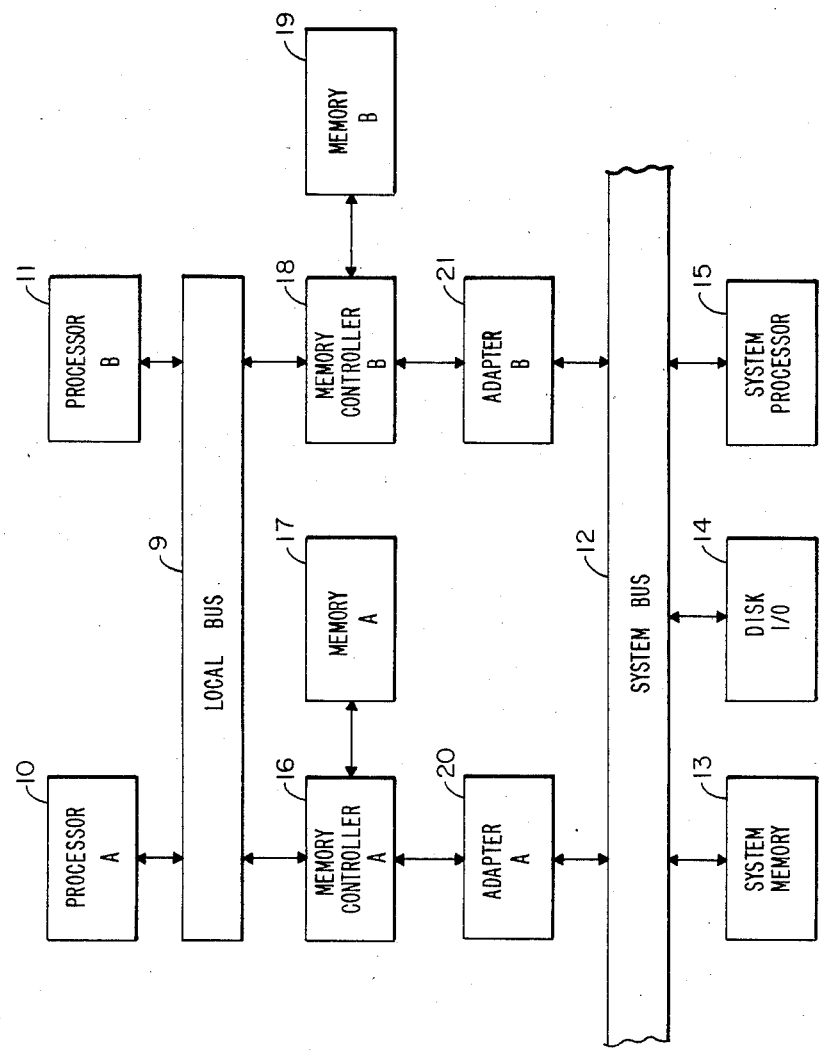
FIG. 1 is a block diagram of a portion of a computer using large capacity memory and memory controllers.

In FIG. 1 is shown a block diagram of a portion of a computer system with memory and a memory controller in which the novel memory failure detection apparatus is utilized. Standard computer system elements are processor 10, processor 11, system bus 12, system memory 13, disk input/output device 14 and system processor 15. In the prior art processors 10 and 11 would normally be connected to system bus 12 along with system processor 15 and they would cooperate in a multiprocessing arrangement to process application programs with system processor 15 being a master processor.

The two memories 17 and 19 are large capacity memories basically dedicated to the joint use of application program processors 10 and 11 to increase their operating efficiency, and to increase the efficiency of use of memories 17 and 19. Memories 17 and 19 are respectively associated with memory controller 16 and memory controller 18 which control access to the memories. Processors 10 and 11 are not connected directly to system bus 12, but rather are connected to a local bus 20. Also connected to local bus 20 are the memory controllers 16 and 18. Memory controllers 16 and 18 permit shared access to their respective associated memories 17 and 19 by either processor 10 or processor 11. In this manner the chances of either processors 10 or 11 having to wait to gain access to a memory are decreased.

Memories 17 and 19 may also be accessed from system bus 12 via adapters 20 and 21 respectively to load application programs and data to be processed into these memories for subsequent use by processors 10 and 11. Similarly, memories 17 and 19 may be read out to circuits connected to system bus 12.

In addition, processors 10 and 11 each have access via a memory controllers 16 and 18 and adapter circuits 20 and 21 respectively connected thereto to system bus 12 to gain access to other storage circuits connected thereto such as system memory 13 and disk I/0 14. The circuit details of an exemplary memory controller 16 and a memory 17 are shown in FIG. 3 which is described further in this specification.

Figure 2:
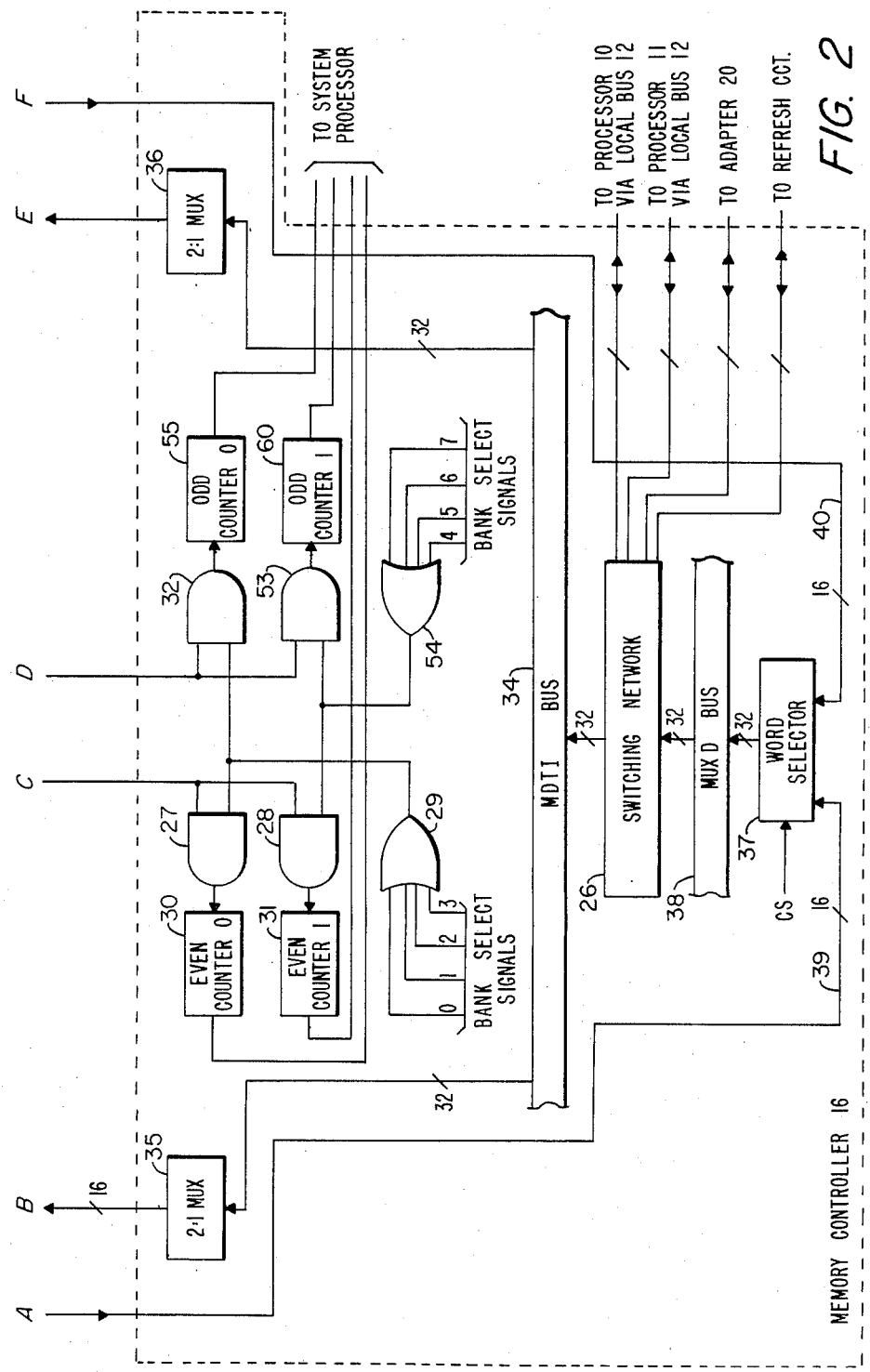
FIG. 2 is a block diagram schematic of a memory controller including memory error detection apparatus in accordance with the teaching of the invention.

In FIG. 2 is shown a detailed block diagram schematic of a memory controller 16 and an associated memory 17. Since controller 16 with memory 17 is the same as memory controller 18 with memory 19 in FIG. 1, only the schematic of memory controller 16 and memory 17 are shown in FIG. 2 and are described hereinafter.

On the right edge of the portion of FIG. 2 identified as memory controller 16 are shown four input/output connections to processor 10, to processor 11, to adapter 20 and to a memory refresh circuit (not shown). Each of these four connections can carry information in both directions as previously described with reference to FIG. 1. In addition, the connections between memory controller 16 and associated memory 17 are shown. The four connections identified in the beginning of this paragraph are all connected to a switching network 26 implemented with buffer amplifiers. The data paths within memory controller 16 are mostly thirty-two bit paths as indicated by a slash mark and the number thirty-two adjacent thereto.

The other circuits within memory controller 16 are word selector 37 which has two sixteen bit inputs and a thirty-two bit output. Word selector 37 is made up of eight Quad 2:1 Multiplexer chips designated 74A5157 which are available from Texas Instruments and from other sources. Each of these chips is a four pole double throw switch. Word selector 37 is used to reverse or translate the two groups of sixteen input bits at its output. That is, the sixteen bits at the input from path 39 may be either the lower order sixteen bits or the higher order sixteen bits of the thirty-bit output from word selector 37. Similarly, the sixteen bits at the input of word selector 37 from path 40 will be the remaining sixteen of the thirty-two bits output from word selector 37.

At the output of memory controller 16 to memory 17 are two 2:1 Multiplexers 35 and 36. Multiplexers 35 and 36 are each made up of a number 74AS257 multiplexers having tristate outputs. That is, the output may be high, low or open. Each of multiplexers 35 and 36 have thirty-two input bits and sixteen output bits. These 2:1 multiplexers 35 and 36 are used to selectively choose either the higher order sixteen bits or the lower order sixteen bits to be applied to the even memory 51 and odd memory 52 in memory 17. Memory 51 is actually two memories 51A and 51B, and memory 52 is actually two memories 52A and 52B.

When processor 10 requests and gains access to memory controller 16 for a read operation from memory 17, an address is sent that is used to address memory 17. In response thereto a thirty-bit word is read out of memory 17 and input to memory controller 16 as sixteen bits on path 39 to one input of word selector 37 and sixteen bits on path 40 to the other input of word selector 37. In response to a control signal input to word selector 37 the two sets of sixteen input bits are selectively connected to the higher order or lower order sixteen-bits of the thirty-two bit output from word selector 37.

The output from word selector 37 is connected to a thirty-two bit MUXD bus 38 to which is also connected switching network 26. For the read operation from memory 17 a control signal is generated which operates switching network 26 to connect the thirty-two bit word read from memory 17 to the input/output path to processor 10.

Alternatively, if processor 10 is writing to memory 17, a thirty-two bit word is present on its input/output to memory controller 16. A control signal is generated which operates switching network 26. Thus, the thirty-bit word at the input/output from processor 10 is connected to MDIT bus 34. Multiplexers 35 and 36 have their inputs connected to MDIT bus 34 and control signals are applied to them to select which of the higher order and lower order sixteen bits of the thirty-bit word on bus 34 will pass through 2:1 multiplexers 35 and 36 and be stored in even memory 51 and odd memory 52 of memory 17.

In an operation where processor 10 requests and is granted access to memory controller 16 to read from memory 17, the thirty-two bit word read out of memory 17 appears as sixteen-bits on path 39 and sixteen-bits on path 40. As previously described these two sets of sixteen bits are selectively transposed through word translator 37 and are present on MUXD bus 38. A control signal is generated which operates switching network 26 to connect the thirty-bit word read out of memory 17 to the input/output to processor 10.

If instead processor 10 is writing to memory 17, after the processor requests and receives access to memory controller 16 a control signal is generated which operates switching network 26 to connect the thirty-two bit word to be written into memory 17 to MDIT bus 34. As previously described other control signals operate 2:1 multiplexers 35 and 36 to selectively apply the higher order and lower order sixteen-bits of the word to even memory 57 and to odd memory 52 of memory 17.

In an operation where processor 10 requests and receives access to memory controller 16 to be connected via adapter 20 and system bus 12 to other storage circuits, such as system memory 13, different control signals are generated. When this is a write operation a control signal operates switching network 26 and a data word from processor 10 is passed directly to adapter 20. As previously described adapter 20 will gain access to system bus 12 and will store the data word from processor 10 in the requested system storage circuit.

In an operation where processor 10 is reading from a system storage circuit, such as system memory 13 connected to system bus 12, processor 10 first requests and then receives access to memory controller 16. The connection to adapter 20 is the same as described in the last paragraph and the read request and address are passed to adapter 20. The connection between processor and memory controller 16 is then broken. As previously described, controller 16 can now handle read/write requests from processor 11, but processor 10 cannot request any other read or write operations with controller 16 or controller 18 until the present read operation from a storage circuit on system bus 12 is completed.

When the read operation requested by processor 10 has been accomplished by adapter 20, this adapter makes a request for access to memory controller 16 and indicates that it needs a connection to processor 10. When the access request by adapter 20 is granted a control signal is generated which operates switching network 26 to pass a data word on the input/output from adapter 20 through network 26 to the input/output to processor 10.

In an operation where a circuit connected to system bus 12, such as system processor 15 and system memory 13, requests access to memory 17 to either read data from this memory, or to store other data or programs in this memory for use by processor 10 in future processing. When system processor 15 wants to write into memory 17 it first gains access to and transmits information to be written and an address in memory 17 to adapter 20. Adapter 20 in turn requests access to memory controller 16 to write into memory 17. When this request is granted a control signal is generated which operates switching network 26. A thirty-two bit word from adapter 20 is thereby connected to MDIT bus 34. As previously described, 2:1 multiplexers 35 and 36 are operated to selectively place the higher order and lower order sixteen bits of the thirty-two bit word from adapter 20 into even memory 57 and odd memory 52.

To read memory 17 to adapter 20 and thence to a circuit connected to system bus 12, memory 17 is addressed and read out. A control signal is generated that operates switching network 26 to connect the thirty-two bit word read out to adapter 20 and thence to system bus 12.

Thirty-two bit word memory 17 is made up of two sixteen-bit memories 51 and 52 in the preferred embodiment of the invention. As mentioned previously memory 51 is made up of two memories 51A and 51B which are physically mounted on two separate printed circuit boards. Similarly, memory 52 is made up of two memories 52A and 52B which are also physically mounted on two separate printed circuit boards. Each of memories 51A, 51B, 52A and 52B each contain one or more banks of memory. Data or program instructions to be stored in even memory 51 are switched through memory controller 16 to even data bus 41, and then over path 43 to the input of memories 51A and 51B. Memories 51A and 51B also have an address applied thereto and a read/write indication that are not shown but which are well known in the art. The operation of memory 51A and 51B in response to such signals is also well known in the art.

Information read out of memory 51 is twenty-two bits wide, sixteen bits of which are the information of interest, and six bits of which are an error correction code. The sixteen information bits read out of even memory 51 are connected to the inputs of buffer amplifier 45. Amplifier 45 is made up of sixteen individual amplifiers, and are implemented with Fairchild 74F373 Tri-State Octal Registers operating as buffer amplifiers. Buffer amplifier 45 is controller by control signal CS9 which is generated and applied to amplifier 45 only when even memory 51 is to be read out.

The six error correction bits read out of even memory 51 during a memory read operation are input to error circuit 47. The sixteen information bits read out of even memory 51 are switched through buffer amplifier 45 to even data bus 41 and are input via path 56 to error circuit 47. This makeup of sixteen information bits and six error correction bits is a standard 16/6 Hamming code that is well known in the art. Error circuit 47 is an AMD2960 error correction and detection chip available from American Micro-Devices, and is operated in a standard manner. Error circuit 47 processes the sixteen bit data present at its input to check for and correct errors in the sixteen bits, if at all possible. The checked and/or corrected sixteen bit information word is output from error circuit 47 back over path 56 to even data bus 41. This information word then goes from bus 41 onto leads 39 back into memory controller 16 to word selector 37 as previously described.

While the memory circuit operation described in the previous paragraphs is for even memory 51, the same described operation applies to odd memory 52. Accordingly, the operation is not again repeated, with reference to odd memory 52.

Error circuits 47 and 48 also each have two other outputs indicating uncorrectable errors and correctable errors. The uncorrectable error outputs are tied together as shown in FIG. 3 and go to the system processor to indicate that processing is to be stopped until the problem causing the uncorrectable errors is corrected. The correctable error outputs from error circuits 47 and 48 are counted and periodically checked by the system processor. Normally there will be no correctable error count, or at most a sporadic low count. The existence of an error count on a regular basis indicates to the system processor that a memory chip on one of the printed circuit memory boards has gone bad and the board should be replaced.

In accordance with the teaching of the invention with the particular embodiment disclosed herein, the correctable error outputs from error circuits 47 and 48 are steered to and stored in different correctable error counters 30, 31, 55 and 60 to provide an indication to the system processor not only that there is a bad memory chip on one of the memory boards (51A, 51B, 52A, 52B) that is causing the correctable errors, but also which memory board it is on so that maintenance personnel may quickly replace the board without increased system down time to test and ascertain which memory board has a bad memory chip. Counters 30, 31, 55 and 60 are each a 74AS869 eight-bit counter available from Texas Instruments and other chip manufacturers. In alternative embodiments of the invention one error detector/counter may be provided for memory segments and/or replaceable memory units of any size.

In memory 17, memories 51A, 51B, 52A and 52B are each on separate printed circuit memory boards. Of the memory as a whole, of eight memory banks designated 0-8, banks 0-3 are located on boards which are even memory 51A and odd memory 52A, and banks 4-7 are located on boards which are even memory 51B and odd memory 52B. More specifically, memory banks zero and two are on the memory board designated as even memory 51A, memory banks one and three are on the memory board designated as odd memory 52A, memory banks four and six are on the memory board designated even memory 51B, and memory banks five and seven are on the memory board designated odd memory 52B.

Because error circuit 47 checks memories 51A and 51B and error circuit 48 checks memories 52A and 52B, it can be determined which of the four memory boards 51A, 51B, 52A or 52B has become defective.

To make this memory failure determination memory failure detection apparatus is provided which is located in memory controller 16. This failure detection apparatus comprises AND gates 27, 28, 32 and 53; OR gates 29 and 54; and counters 30, 31, 55 and 60. Counter 30, 31, 55 and 60 respectively count detectable error counts from memories 51A, 51B, 52A and 52B.

The correctable error output from error circuit 47 is applied to one of the two inputs of AND gates 27 and 28, while the correctable error output from error circuit 48 is applied to one of the two inputs of AND gates 32 and 53. The second input of AND gates 27 and 32 is connected to the output of OR gate 29, and the second input of AND gates 28 and 53 is connected to the output of OR gate 54. There are four inputs to OR gate 29 indicating that the selected memory bank is one of banks zero through three, and there are four inputs to OR gate 54 indicating that the selected memory bank is one of banks four through seven. The inputs to OR gates 29 and 54 come from the bank select signals indicating the selected memory bank.

When the selected memory bank is one of banks zero through four, the output of OR gate 29 is high. As described above this output is connected to one of the two inputs of AND gates 27 and 32. If a correctable error is detected and corrected by error circuit 47 from even memory 51A, the correctable error output of error circuit 47 is high. As a result only AND gate 27 has its two inputs high and its output therefore goes high to place a count in even counter 30 indicating the error is located in memory banks zero and two, which may be one memory board. Each time there is a correctable error from even memory 51A another count is placed in counter 30. Similarly, if a correctable error is detected and corrected by error circuit 48 from odd memory 52A, the correctable error output of error circuit 48 is high. As a result only AND gate 32 has its two inputs high and its output therefore goes high to increment counter 55 indicating the error is located in memory banks one and three, which may be on one memory board. Also, if a correctable error is detected and corrected by error circuit 47 from even memory 51B, the correctable error output of error circuit 47 is high. As a result only AND gate 28 has its two inputs high and its output goes high to increment even counter 31 indicating that the error is located in memory banks four and six, which may be on one memory board. Finally, if a correctable error is detected and corrected by error circuit 48 from odd memory 52B, the correctable error output of error circuit 48 is high. As a result only AND gate 53 has its two inputs high and its output goes high to increment counter 60 indicating the error is located in memory banks five and seven, which may be on one memory board.

Error counters 30, 31, 55 and 60 each have a multi-bit output on which is a binary number indicating the count therein. In FIG. 2 each of these multi-bit outputs is shown as a single lead and goes to the system processor. The system processor periodically writes the contents of counters 30, 31, 55 and 60 into some arbitrarily chosen memory location and then reads the data from that location to determine the number of correctable errors. The count indicates to the system processor how bad the memory banks are which cause the correctable error counts to be generated. In response to correctable error counts in specific ones of counters 30, 31, 55 and 60 the system processor generates and displays a trouble message to system maintenance personnel indicating that there is a bad memory bank, and identifies the specific board due to the operation of the memory failure detection apparatus described above. The maintenance personnel limitedly or completely shut down the system and quickly replace the memory board(s) having the indicated defective memory bank to restore the memory to complete, reliable functioning. No extended system shut down is needed to test and determine which memory board is defective.

Counters 27, 28, 32 and 53 can each only count to two-hundred fifty-five at which point they stop counting until they are reset. Although not shown in FIG. 2 there is a reset input to each of counter 27, 28, 32 and 53 and the system processor energizes all four reset inputs during the write-counters cycle it has periodically commanded to obtain the contents of these four counters as described previously.

With the present invention error correction circuits may also be provided with any desired quantity of memory such as a replaceable unit, with each bank of memory on a replaceable unit, or with a number of replaceable units. Logic OR gates may then be used to combine error correction circuit outputs from any combination of memory units or segments before they are applied through an AND gate to an error counter. This flexibility permits modular growth and/or organization of the memory and error counters associated therewith.

While what has been described hereinabove is the preferred embodiment of the invention, it should be understood that numerous changes may be made without departing from the spirit or scope of the invention. For example, uncorrectable errors may be counted instead, or the number of processors, memory controllers and memories may be increased.

What is claimed is:

1. Apparatus for identifying a defective portion of a memory comprising a plurality of separately replaceable memory boards organized so that first and second memory boards function with a first error correction circuit, wherein third and fourth memory boards function with a second error correction circuit, wherein both said error correction circuits correct and provide an indication of correctable memory errors from their associated memory boards, and wherein board selection apparatus generates signals to select a board of said memory during addressing, said apparatus comprising:

first logic means receiving a first signal from said first error correction circuit indicating a correctable memory error from reading said first and said second memory boards, said first logic means also receiving a second signal from said board selection apparatus indicating that said first or said second memory boards have been selected and upon the concurrence of said first signal and said second signal said first logic means provides separate indications of which of said first of said second memory boards has failed;

second logic means receiving a third signal from said second error correction circuit indicating a correctable memory error from reading said third and said fourth memory error from reading said third and said fourth memory boards, said second logic means also receiving a fourth signal from said board selection apparatus indicating that said third or said fourth memory boards have been selected and upon the concurrence of said third signal and said fourth signal said second logic means provides separate indications of which of said third or said fourth memory boards has failed;

a first counter connected to the output of said first logic means and counting the number of times that said first logic means determines that there is a failure of said first memory board, a second counter connected to the output of said first logic means and counting the number of times that said first logic means determines that there is a failure of said second memory board, a third counter connected to the output of said second logic means and counting the number of times that said second logic means determines that there is a failure of said third memory board, and a fourth counter connected to the output of said second logic means and counting the number of times that said second logic means determines that there is a failure of said fourth memory board, said first, second, third and fourth counters being external to all of said memory boards.

2. The invention in accordance with claim 1 wherein said first logic means comprises a first gate circuit and a second gate circuit, and said second logic means comprises a third gate circuit and a fourth gate circuit.

3. The invention in accordance with claim 2 further comprising:

third logic means responsive to said bank selection apparatus to provide an indication to said first gate circuit and to said third gate circuit that either said first or said third memory banks have been selected for addressing, and third logic means responsive to said bank selection apparatus to provide an indication to said second gate circuit and to said fourth gate circuit that either said second or said fourth memory banks have been selected for addressing.

4. The invention in accordance with claim 1 further comprising memory means to which the contents of said each of said counters are periodically transferred, and the contents of said memory means are then read to know the number of failures in each of said memory banks.

5. The invention in accordance with claim 4 wherein said counters are automatically reset after their contents are transferred to said memory means.

* * * * *